Nov. 10, 1936.   W. LINDROOS   2,060,738
CREAM SEPARATOR
Filed March 14, 1936
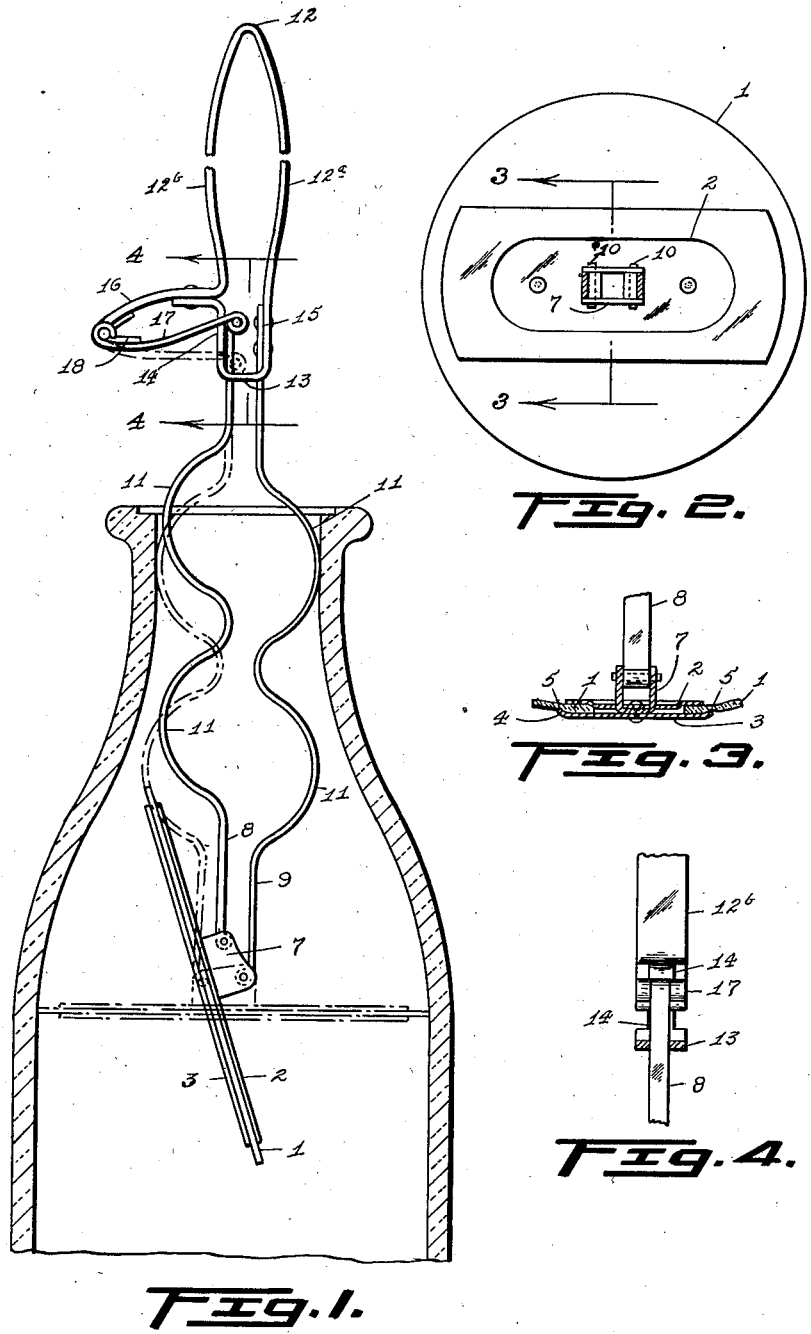

Patented Nov. 10, 1936

2,060,738

UNITED STATES PATENT OFFICE 2,060,738

CREAM SEPARATOR

William Lindroos, Toronto, Ontario, Canada

Application March 14, 1936, Serial No. 68,796

4 Claims. (Cl. 210—51.5)

My invention relates to improvements in cream separators as described in the present specification and shown in the accompanying drawing that forms a part of the same.

My invention relates particularly to a device designed especially for insertion within a milk bottle below the level of the cream whereby to provide a partition between the cream and the milk so that the cream only may be withdrawn.

Various devices for accomplishing this result have to my knowledge been designed heretofore but all of said known devices have attendant disadvantages, one of the chief of which is that such devices will not remain in their intended positions within the bottle during the pouring operation.

My present invention has for its objects the provision of a practical and simple device which may be easily collapsed to permit of its passage through the bottle neck and when brought to its desired operating position will be firmly held thereto so as not to become dislodged in the pouring operation; to provide a device which may be used in bottles of different sizes within reasonable limits; to provide a device of few parts which may be easily cleaned and sterilized; and generally to provide an efficient and inexpensive device for the purpose described.

I attain these and other objects by the provision of a flexible disc having a central inflexible mounting, to one face of which are pivotally secured the ends of spaced parallel members having opposed protuberances adapted for engagement with the inner wall of the bottle neck whereby to provide lateral support for the device, one of said members being movable longitudinally whereby to move the disc into alignment with the other member to permit of positioning the device within the bottle, and being spring pressed to normally hold said disc at right angles to said members.

There are many details contributing to the accomplishments of the general objects just set forth and these together with the objects and advantages will appear from the following descriptions and be particularly pointed out in the appended claims.

In describing the invention reference will be made to the accompanying drawing in which:—

Figure 1 is a vertical sectional view through a portion of a milk bottle showing my improved separator in process of being placed therein, and also showing said separator in operative position in dotted lines.

Figure 2 is a plan view of the separator disc.

Figure 3 is a cross sectional view through the separator disc, taken on the line 3—3 of Figure 2.

Figure 4 is a vertical sectional view taken through a portion of the handle on the line 4—4 of Figure 1.

Like numerals of reference indicate corresponding parts in the various figures.

In the preferred embodiment of my invention I employ a circular disc 1, constructed of rubber or other flexible material and of the required size and thickness, whereby to provide a partition adapted to be inserted within the bottle between the milk and the cream.

The disc 1 is supported between metal plates 2 and 3 respectively, which plates are preferably of rectangular shape in plan and are of lesser width than the opening through the neck of the bottle so as to permit of their being inserted in the bottle. The lowermost plate 3 is of slightly greater width than the upper plate and projects past the edge thereof at each side and has the marginal pieces turned upwardly slightly as at 5 whereby to give a slight upward angle to the opposite sides of the flexible disc 1, as shown at 5 in Figure 3. The rubber disc is preferably cut away centrally and the top plate recessed accordingly to fit within the opening formed by cutting away said disc and the plates are secured together by one or more rivets, or in any other desired manner.

The disc is provided with a socket 7 for the purpose of attaching the supporting standard and said socket for facility and cheapness of construction preferably consists of a U shaped piece of metal having its base positioned between the plates 2 and 3 of the disc and secured by the rivets used to fasten the disc sections together and having its arms extending outwardly through slots in the top plate whereby to provide a channel extending longitudinally of the said plates.

8 and 9 are rods pivotally mounted in spaced relation to each other at their one ends on pins 10 extending transversely of the socket 7, said rods being of such length that when the disc is in position within the bottle they will project a considerable distance above the top of the bottle, and said rods are bent to provide one or more pairs of opposed protuberances 11, of which, according to the size of the bottle, at least one pair is adapted to tightly engage the opposing sides of the interior of the neck of the bottle whereby to centre the members 8 and 9 and thereby hold the disc to its true horizontal position within the bottle.

12 is a handle consisting of a metal strap of somewhat greater width than the members 8 and 9 (which latter may of course be flat or round in cross section, as desired) and being folded double to provide spaced parallel arms, 12a and 12b one of which arms, indicated by the numeral 12a, being bent to provide a short right angle portion 13 and an upwardly turned portion 14, and said right angle portion is provided with suitable slots through which the members 8 and 9 project. The member 9, which may be termed the rigid rod, or standard, is rigidly secured to the arm 12a as shown at 15, and to all intents and purposes is an integral part of the handle while the rod 8, which may be termed the operating rod, slidably extends through the right angle portion 13 and in the operating position of the disc terminates just above the cross piece 13. The arm 12b of the handle, at a point removed from the cross piece 13, is turned outwardly at substantially right angles to said arm to provide a lateral arm 16 and is rigidly secured to the top end of the portion 14 of the arm 12a, which portion 14 is preferably reduced in width and is turned outwardly to provide a brace for the arm 16, which latter is preferably arcuate in side elevation.

A lever 17 hingedly secured at its one end to the end of the arm 16 and at its other end hinged to the top end of the operating rod 8 provides a means for raising said rod to tilt the disc to a position substantially in alignment with the said rod whereby the disc may be inserted through the neck of the bottle and downwardly through the cream without unduly agitating the latter. A spring 18 encircling the hinge connection between the arm 16 and the lever 17 exerts downward pressure on said lever whereby on release of upward pressure on said lever the disc will be automatically forced to its position at right angles to the plane of the standard 9. The lever 17 is slotted for the reception of the reduced portion 14 of the handle whereby said lever may slide freely thereover.

When it is desired to withdraw a part, or all, of the cream from a bottle it is simply necessary to exert a squeezing pressure on the arm 16 and the lever 17, thus causing the rod 8 to be drawn upwardly to tilt the disc to permit its entry into the bottle and after the disc has been positioned below the level of the cream release of pressure on the lever will permit the said disc to assume a horizontal position and at the same time the opposed protuberant portions 11 of the members 8 and 9 will closely engage the inner wall of the bottle neck and hold the disc centred in relation to the bottle.

In practice it has been found advantageous to construct the members 8 and 9 of spring material with the diameter of the device through the protuberant portions when not confined by the bottle being slightly greater than that of the interior of the bottle neck whereby when the device is placed in the bottle it will be compressed and thereby tend to hold the device more firmly in position.

The provision of two or more protuberant parts provides for adjustment of the device in accordance with the varying depth of the cream in different bottles.

What I claim is:—

1. A cream separator comprising a flexible disc, a pair of rods pivoted to said disc and extending laterally therefrom in spaced parallel relation, one of said rods being movable longitudinally in relation to the other of said rods whereby to tilt said disc into substantial alignment with said other rod, said rods being provided intermediate of their lengths with opposed protuberances adapted to bear against the interior wall of the neck of a bottle at opposite sides thereof, a handle rigidly secured to the outer end of one of said rods and having a right angle extension slidably receiving said longitudinally movable rod, said handle also having a lateral extension, a lever hinged at its one end to the end of said lateral extension and at its other end being hinged to the said longitudinally movable rod whereby pressure on said lever in one direction will cause said disc to tilt, and spring means normally holding said disc at right angles to the longitudinal plane of said rods.

2. A cream separator comprising a pair of plates secured in superimposed relation to one another, a flexible disc supported between said plates and projecting peripherally therefrom, a socket positioned centrally of one of said plates, a pair of rods pivoted in said socket and extending therefrom in spaced parallel relation to each other, one of said rods being movable longitudinally in relation to the other rod whereby to tilt said disc into substantial alignment with said other rod, said rods being bent outwardly intermediate of their lengths to provide opposed protuberances adapted to bear against the inner face of the neck of a bottle, a handle rigidly secured to the outer end of one of said rods and having an extension at right angles thereto receiving the top end of said longitudinally movable rod, said handle also having a lateral extension, and a spring-pressed lever hingedly connecting the end of said lateral extension with the top end of said movable rod.

3. A cream separator as defined in claim 2 in which the lowermost of said plates is of greater width than the top plate and projects beyond the edges of said top plate at the side thereof, said projecting portions of the lowermost plate being turned towards the top plate to impart an upward inclination to said flexible disc at opposite sides of said plates.

4. A cream separator comprising a flexible disc secured between superimposed metal plates and projecting peripherally therefrom, a socket positioned centrally of one of said plates, a standard pivoted at one end in said socket, an operating rod pivoted at one end to said socket and extending parallel with said standard, said rod being movable longitudinally in relation to said standard whereby to move said disc to and from a position at right angles to the longitudinal plane of said standard, said standard and said rod being provided with opposed lateral extensions adapted to bear against opposite sides of the interior wall of the neck of a bottle, a handle constituting a longitudinal extension of said standard, said handle having a portion slidably receiving the top end of said rod, said handle having one of its ends turned outwardly at a point spaced from the top end of said longitudinally movable rod, and a lever hingedly connected at one end to the outwardly turned end of said handle and extending parallel therewith and at its other end being hinged to the top end of said rod whereby on the movement of said lever in a direction towards said outwardly turned end of the handle said rod will be moved to tilt said disc, and spring means exerting pressure on said lever to hold said disc at right angles to said standard.

WILLIAM LINDROOS.